(12) United States Patent
Zimowski et al.

(10) Patent No.: US 6,339,771 B1
(45) Date of Patent: Jan. 15, 2002

(54) METHOD AND SYSTEM FOR MANAGING CONNECTIONS TO A DATABASE MANAGEMENT SYSTEM

(75) Inventors: Melvin Richard Zimowski, San Jose, CA (US); Jeffrey David Aman, Poughkeepsie; Steven J. Greenspan, Hyde Park, both of NY (US); Patrick Michael LiVecchi, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/611,604

(22) Filed: Jul. 7, 2000

Related U.S. Application Data

(63) Continuation of application No. 09/104,879, filed on Jun. 25, 1998, now Pat. No. 6,112,196.

(51) Int. Cl.$^7$ .............................................. G06F 17/00
(52) U.S. Cl. ................................. 707/2; 707/8; 707/10; 709/108
(58) Field of Search .............. 707/1–206; 709/200–232, 709/100–332

(56) References Cited

U.S. PATENT DOCUMENTS

| | | | | |
|---|---|---|---|---|
| 5,465,359 A | * | 11/1995 | Allen et al. ................... | 709/101 |
| 5,511,076 A | * | 4/1996 | Ramakrishnan et al. .... | 709/250 |
| 6,014,666 A | * | 1/2000 | Helland et al. ................. | 709/9 |
| 5,983,005 A | * | 2/2000 | Monteiro et al. ........... | 709/231 |
| 6,026,428 A | * | 2/2000 | Hutchinson et al. ........ | 709/106 |
| 6,112,196 A | * | 8/2000 | Zimkowski et al. ............ | 707/2 |
| 6,199,081 B1 | * | 3/2001 | Meyerzon et al. ............. | 707/6 |
| 6,272,351 B1 | * | 8/2001 | Shrader ....................... | 709/206 |

OTHER PUBLICATIONS

Cohen et al. Beaver: A Computational–geometry–based tool for switchbox routing, CAD of Integrated Circuits & Systems, IEEE, pp. 864–697, vol. 7, Jun., 1988.*

Unnikrishnan et al., "Threaded linear hierarchical quadtrees for computation of geometric properties of binary images", Software Engineering, IEEE pp. 659–665, vol. 14, May, 1988.*

Huang et al., "Nondistributed multiparty connection establishment for broadband networks", Communications, 1992, iCC '92, pp. 1392–1396, vol. 3, Jun. 1992.*

Shohi et al., "Speculative multithreaded processors", Computer, vol. 34, Issue 4, Apr. 2001, pp. 66–73.*

(List continued on next page.)

*Primary Examiner*—Thomas Black
*Assistant Examiner*—David Jung
(74) *Attorney, Agent, or Firm*—Sawyer Law Group LLP; Ingrid M. Foerster

(57) ABSTRACT

A system and method for processing a request utilizing a database management system in a computer system is disclosed. The database management system manages at least one database. At least one database subsystem corresponding to the database management system is available. The computer system includes a plurality of worker threads. The method and system include assigning the request to a worker thread of the plurality of worker threads. The worker thread is for aiding in execution of the request. The method and system also include providing a connection to a particular database subsystem for the worker thread and associating the connection with the worker thread if the worker thread has not previously used the particular database subsystem. The method and system further include reusing the connection to the particular database subsystem that is associated with the worker thread if the worker thread has previously used the particular database subsystem.

13 Claims, 6 Drawing Sheets

OTHER PUBLICATIONS

Oguma et al., "A scheduling mechanism for lock–free operation of a lightweight process library for SMP computers", Parallel and Distributed Systems, 2001, ICPADS 2001, Proceedings, Eighth International Conference on, 2001, pp. 235–242.*

Balasubramonian et al., "Dynamically Allocating Processor Resources between Nearby and Distant ILP", Computer Architecture, 2001, Proceedings, 28th Annual International Symposium 2001, pp. 26–37.*

* cited by examiner

METHOD AND SYSTEM FOR MANAGING CONNECTIONS TO A DATABASE MANAGEMENT SYSTEM

The present application is a continuation of U.S. patent application Ser. No. 09/104,879, now issued as U.S. Pat. No. 6,112,196.

FIELD OF THE INVENTION

The present invention relates to database management systems and more particularly to a method and system for more efficiently managing connections to database management systems, thereby improving throughput and response time.

BACKGROUND OF THE INVENTION

Recently the use of the internet has greatly increased. The internet is a collection of networks over which information can be exchanged. The World Wide Web ("WWW") is a facility which links locations on the internet using a particular protocol. The WWW utilizes hypertext markup language ("HTML") and hypertext transfer protocols ("HTTP") in order to transfer data. The internet allows a user on a first system, known as a client, to access information on another system, known as a server. Typically, the client includes a browser through which the user can view information provided by the server. The server typically includes server software which allows communication to clients on the internet. The server software typically includes run time structures including an initialization thread, a listener thread, and a plurality of worker threads. The initialization thread initializes the server. The listener thread listens for work requests arriving from the internet. The worker threads execute work requests for the server software, including work requests that may require the use of other applications residing on a server.

The information provided by the server could be obtained from one or more database management systems. Database management systems are used by computer systems in order to store information and access the stored information. A database management system is software, which manages one or more databases. A database is a collection of information. Typically, a request for information is received by the server software residing on the server. Such a request for information residing in a database is known as a database request. The database request is assigned to a worker thread for processing. In order for the worker thread to access information in a database, a connection between the worker thread and a database management system is created. Note that there may be multiple instances of the database management system on the server. Once the connection is created, the database request can be executed. When processing of the database request is completed, the connection is then typically terminated.

Although the worker thread can use the database management system to execute the database request, creating connections to the database management system is a complex process and can require the execution of an extremely large number of program instructions. As a result, the creation of connections involves significant overhead and may be very time consuming. Each time another database request requiring use of a database management system is received by the server software and assigned to a worker thread, a new connection must be generated. This is true even if the same database management system is to be used to process the database request. Consequently, processing of requests may be slowed.

Accordingly, what is needed is a system and method for more efficiently managing connections. It would also be beneficial if the system and method allowed requests to be processed more efficiently. The present invention addresses such a need.

SUMMARY OF THE INVENTION

The present invention provides a method and system for processing a request utilizing a database management system in a computer system. The database management system manages at least one database. At least one instance of the database management system is available. The computer system includes a plurality of worker threads. The method and system comprise assigning the request to a worker thread of the plurality of worker threads. The worker thread is for aiding in execution of the request. The method and system also comprise providing a connection to a particular instance of the database management system for the worker thread and associating the connection with the worker thread if the worker thread has not previously used the particular instance of the database management system. The method and system further include reusing a connection to a particular instance of the database management system that is associated with the worker thread if the worker thread has previously used the particular instance of the database management system.

According to the system and method disclosed herein, the present invention can reuse connections, thereby increasing system throughput and response time.

DETAILED DESCRIPTION OF THE INVENTION

The present invention relates to an improvement utilizing a database. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
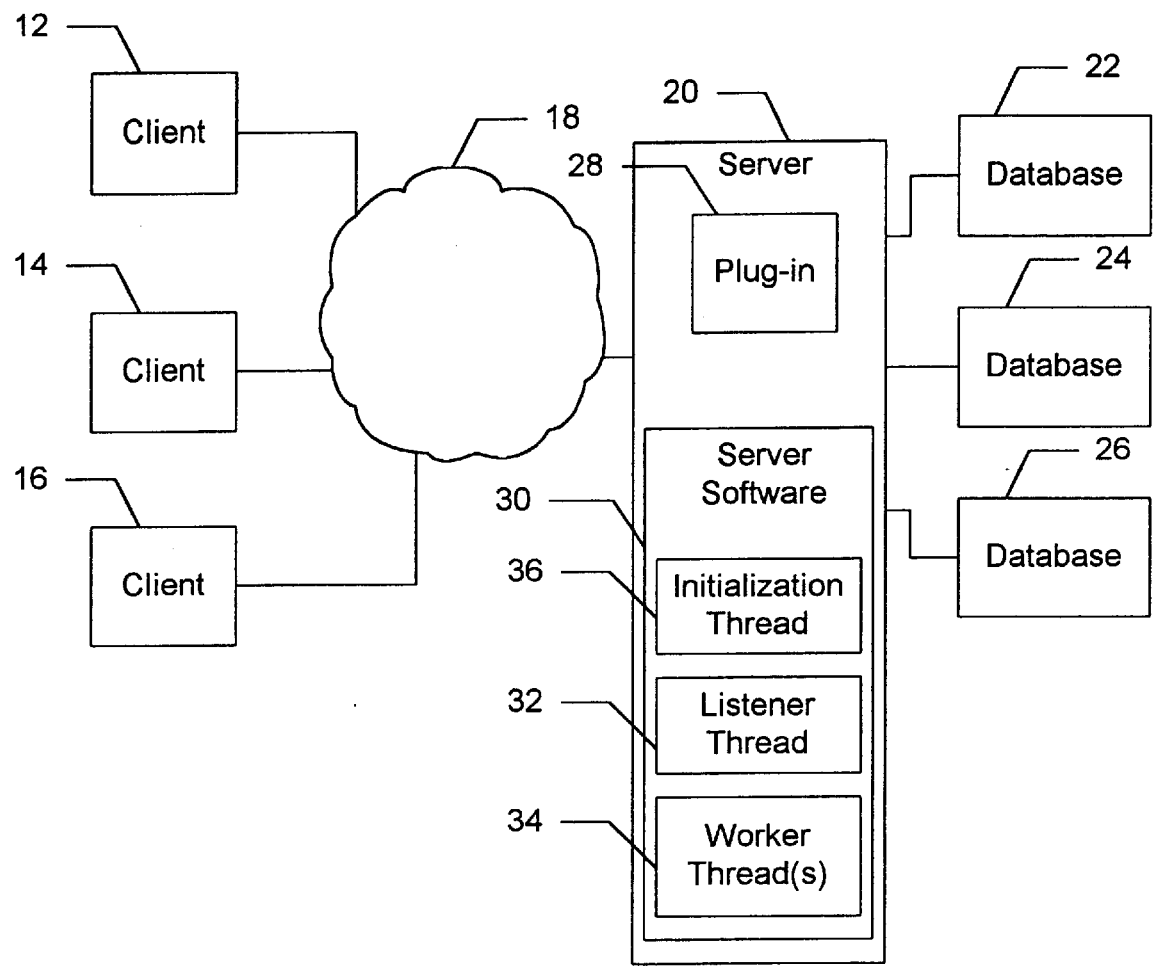
FIG. 1 is a block diagram of a system for accessing a database via the internet.

FIG. 1 is a block diagram of a system 10 for utilizing databases via the internet. The system 10 includes clients 12, 14, and 16. The clients 12, 14, and 16 are coupled with a server 20 via the internet 18. In order to access information through the server 20, the client 12, 14, or 16 sends a request (not shown) to the server 20. The server 20 includes a plug-in 28 and server software 30. The plug-in 28 may provide additional functionality to the server 20 through interactions with the server software 30 and other applications. The server software 30 includes run time structures also depicted in FIG. 1. The run time structures include a listener thread 32, a plurality of worker threads 34, and an initialization thread 36. The listener thread 32 listens for incoming requests. Each worker thread 34 aids in processing an incoming request. The initialization thread 36 initializes the server software 30. The server 20 is be coupled to databases 22, 24, and 26. Each of the databases 22, 24, and 26 holds information.

Figure 2:
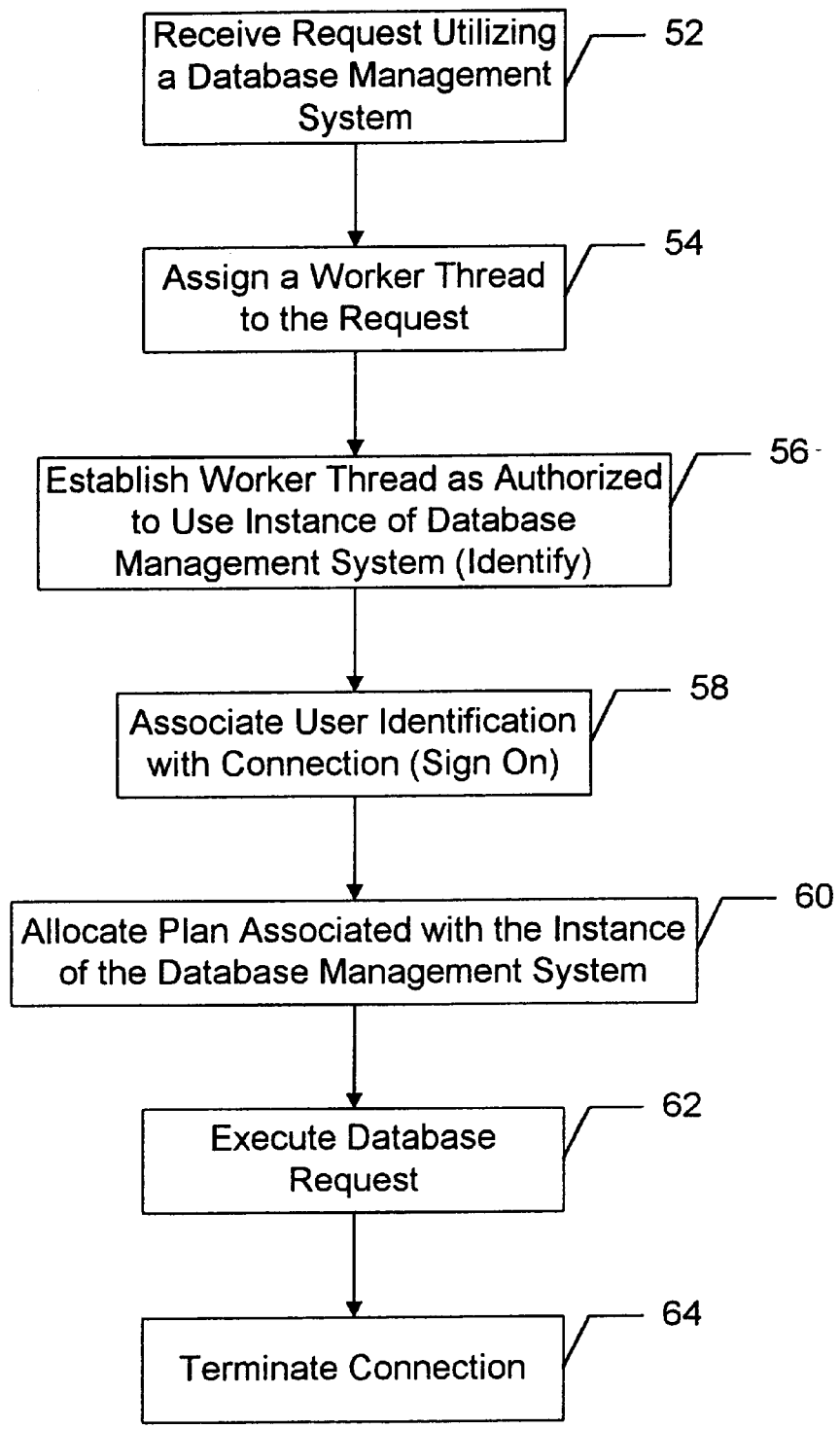
FIG. 2 is a flow chart depicting a conventional method for processing a database request.

FIG. 2 is a flow chart of a conventional method 50 for processing a request which utilizes a database, for example database 22. Such a request is typically known as a database request. The database request typically uses a Structured Query Language ("SQL") statement to perform operations in the database. The database request also includes a user identification which typically identifies the user at the client 12, 14, or 16, making the database request. The database request also typically identifies a section of a plan (not shown) that a database management system (not shown) will use to execute the database request. The database management system manages the corresponding database 22. A plan is typically a plurality of run time structures for a database management system which is used to allow execution of SQL statements. When the database request is actually executed, the section of the plan identified in the database request will be used to execute the database request.

The conventional method 50 commences when a database request for information stored in one of the databases 22, 24, or 26 is received by the server software 30 via step 52. Because the database request is for information stored in a database 22, 24, or 26, the database request utilizes the corresponding database management system. The listener thread 32 typically receives incoming requests being received by the server software 30. Once a database request is received, the worker thread 34 is assigned to aid in processing the database request via step 54. A connection between the worker thread 34 and a database management system (not shown) is created via steps 56, 58, and 60. Note that multiple database management systems can exist on the server 20 at the same time. The worker thread 34 is authorized to use the appropriate instance of the database management system via step 56. In one conventional database management system and operating system, DB2 and OS/390 by International Business Machines, Inc., respectively, this step of authorizing a particular worker thread to use a particular instance of a database management system, called a database subsystem, is known as an "Identify" step. A user identification for the user sending the database request is then associated with the connection being created, via step 58. For DB2, the step 58 is known as "Sign On". The plan for processing the database request is then identified via step 60. For DB2, the step 60 is known as "Create Thread". Through steps 56, 58, and 60, the connection between the worker thread 24 and an instance of the database management system is generated. The database request is then executed via step 62. Once the database request has been executed, the connection is terminated, via step 64. When a new request utilizing the database management system is received, the conventional method 50 is repeated.

Although the system 10 and the conventional method 50 function, those with ordinary skill in the art will realize that the conventional method 50 can be relatively slow. In particular, creating a connection using steps 56, 58, and 60 is costly and may be time consuming. Although each of the three steps used to create a connection, Identify, Sign On, and Create Thread, require time to be executed, the steps do not consume the same amount of system resources when being completed. Typically, the Identify step is the most costly to complete. The Create Thread step requires the next largest amount of system resources to complete. The Sign On step requires the least amount of system resources and time of the three steps to complete. The three steps 56, 58, and 60 together require the execution of a large number of instructions and are relatively costly.

One of ordinary skill in the art will also realize that the conventional method 50 is carried out each time that a request utilizing a database 22, 24, or 26 is received. Thus, one of ordinary skill in the art will recognize that a significant amount of system resources is consumed each time a database request is processed. The first time that a database 22, 24, or 26 is accessed via an instance of the corresponding database management system, the conventional method 50 is extremely time consuming. This is because a large number of instructions are executed to create the first connection. When another database request is received, the conventional method 50 is carried out again and another connection created. Formation of subsequent connections to the instance of the database management system generally requires the execution of fewer program instructions. However, the creation of subsequent connections is still quite expensive. Thus, each time another database request requiring use of the database management system is received by the server software, a new connection is generated via the conventional method 50. Consequently, processing of subsequent database requests remains costly.

The present invention provides for a method and system for processing a request utilizing a database management system in a computer system. The database management system manages a database. At least one instance of the database management system is available. The computer system includes a plurality of worker threads. The method and system comprise assigning the request to a worker thread of the plurality of worker threads. The worker thread is for aiding in execution of the request. The method and system also comprise providing a connection to a particular instance of the database management system for the worker thread and associating the connection with the worker thread if the worker thread has not previously used the particular instance of the database management system. The method and system further include reusing a connection to a particular instance of the database management system that is associated with the worker thread if the worker thread has previously used the particular instance of the database management system.

The present invention will be described in terms of a particular database, a particular architecture, and requests received over the internet. However, one of ordinary skill in the art will readily recognize that this method and system will operate effectively for other types of databases, other architectures, and other requests received from within a single network or computer system. In addition, the present invention will be described in terms of a system having one database and a corresponding database management system residing on the server. However, one of ordinary skill in the art will realize that the present invention will operate effectively for a system having multiple databases, multiple database management systems, and database management systems which reside elsewhere. The present invention will also be described in the context of a single instance of the database management system, or subsystem. However, one of ordinary skill in the art will realize that the method and system are consistent with the use of multiple database subsystems. The present invention is also depicted as having a single connection between a worker thread and a single database subsystem. However, one of ordinary skill in the art will readily realize that the method and system are consistent with a worker thread having connections to multiple database subsystems. In addition, one of ordinary skill in the art will realize that the method and system are consistent with multiple database subsystems utilizing a database.

Figure 3:
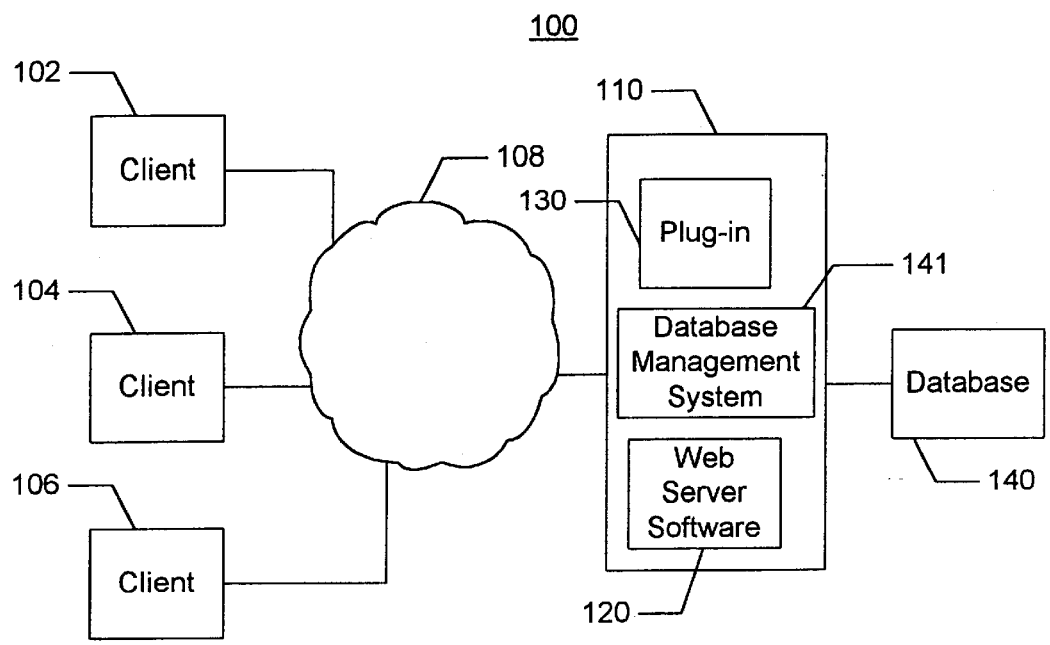
FIG. 3 is a block diagram of a system in which the present invention is utilized.

To more particularly illustrate the method and system in accordance with the present invention, refer now to FIG. 3 depicting one embodiment 100 of the environment in which the present invention is used. The system 100 includes clients 102, 104, and 106. The clients 102, 104, and 106 are coupled with a server 110 via the internet 108. In order to access information through the server 110, the client 102, 104, or 106 sends a request (not shown) to the server 110. The server 110 includes a plug-in 130, server software 120, and a database management system 141. The plug-in 130 may provide additional functionality to the server 110 through interactions with the server software 120 and other applications. In a preferred embodiment, one such additional function relates to use of the database 140. Preferably, the plug-in 130 is NET.DATA, provided by International Business Machines, Inc. However, the server 110 could include other plug-ins (not shown). The server 110 is coupled to a database 140. The database management system 141 manages the database. Preferably, the database management system 141 is DB2. Thus, the database management system 141 is preferably a relational database management system having rows and columns and using relational techniques for storing and retrieving data. However, the server 110 could include or be coupled to other database management systems (not shown) which may or may not be relational database management systems. The present invention is consistent with the use of other database management systems (not shown).

Figure 4:
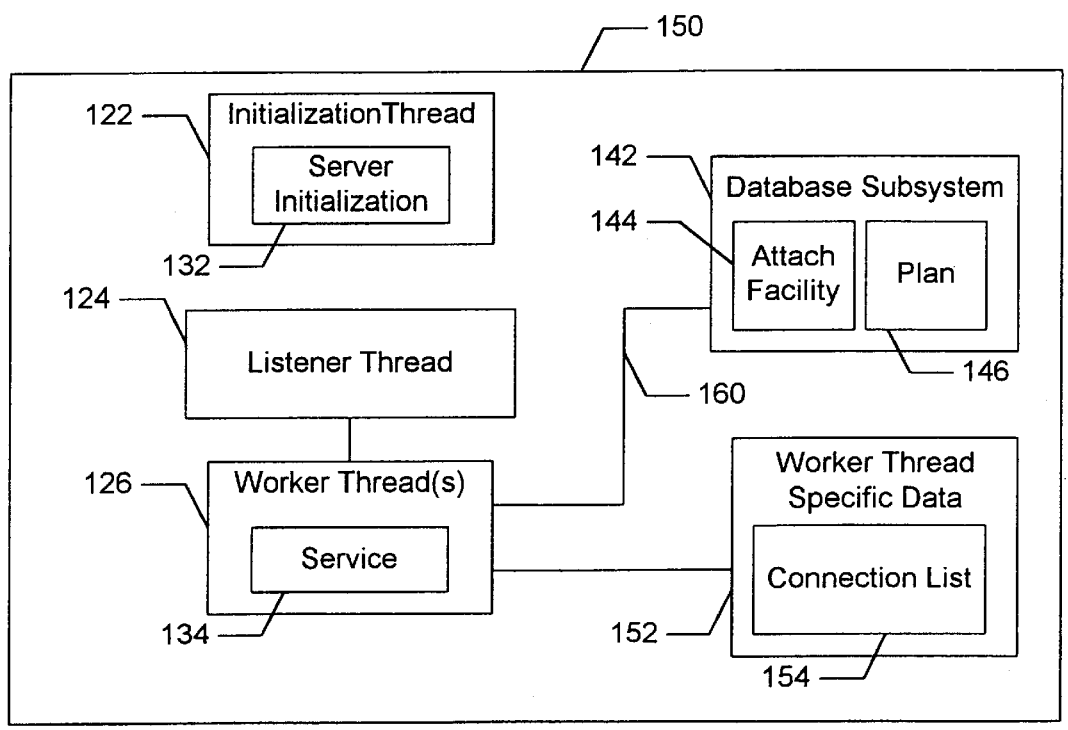
FIG. 4 is a block diagram of the run time structures for a system for more efficiently managing connections in accordance with the present invention.

FIG. 4 depicts a block diagram of the run time structure 150 of the server 110 in accordance with the present invention. The run time structure 150 of the server 100 includes an initialization thread 122, a listener thread 124, and a plurality of worker threads 126. The listener thread 122 listens for incoming requests. Each worker thread 126 aids in processing an incoming request. The worker thread includes a service block 134. The service block is from code contained in the plug-in 130 and is invoked when a request, often termed a database request, utilizes the database 140. The initialization thread 122 initializes the server 110 for service block 134 processing. The initialization thread 122 is, therefore, responsible for generating the worker threads 126 and the listener thread 124. The initialization thread 122 includes a service initialization block 132 generated from code contained in the plug-in 130. The service initialization block 132 is used during initialization of the server 110. The service initialization block 132 creates a key during initialization of the server 110. The key is utilized in a preferred embodiment of the present invention and is further described below. Also in a preferred embodiment, the present invention is an internet connection server application programming interface ("ICAPI") solution.

The run time structure 150 of the server 100 further includes a connection 160 between the database subsystem 142 and the worker thread 126, and worker thread specific data 152. Preferably, the worker thread specific data 152 is created for each worker thread 126. The worker thread specific data 152 includes data about the connections, such as the connection 160, associated with a corresponding worker thread 126. In a preferred embodiment, the worker thread specific data 152 includes a connection list 154 for the corresponding worker thread 126. Also in a preferred embodiment each worker thread 126 may have a corresponding connection list 154. Each element in the connection list 154 data relating to a connection 160 between the worker thread 126 and a particular database subsystem 142. Thus, for each connection 160 from the worker thread 126, the connection list 154 includes an element. The value of the key for the worker thread, discussed above, indicates the address at which the connection list 154 is located. Thus, the worker thread specific data 142 also preferably includes a value (not shown) of the key.

The run time structure 150 of the server 100 further includes a database subsystem 142. The database subsystem 142 is an instance of the database management system 141 on the server 110 and is concurrently accessible by multiple users. In addition, because multiple instances of the database management system 141 are allowed, multiple database subsystems 142 may exist. The database subsystem 142 includes an attach facility 144 and a plan 146. The plan 146 associated with and used by the database subsystem 142 is the plan for the plug-in 130. The attach facility includes application program interfaces (APIs) used to allow a connection 160 between the database subsystem 142 and the worker thread 126. Note that although FIG. 4 depicts a single connection between a particular worker thread 126 and a single database subsystem 142, multiple connections could exist between a worker thread 126 and a plurality of database subsystems 142. In addition, a plurality of worker threads 126 could exist.

Figure 5:
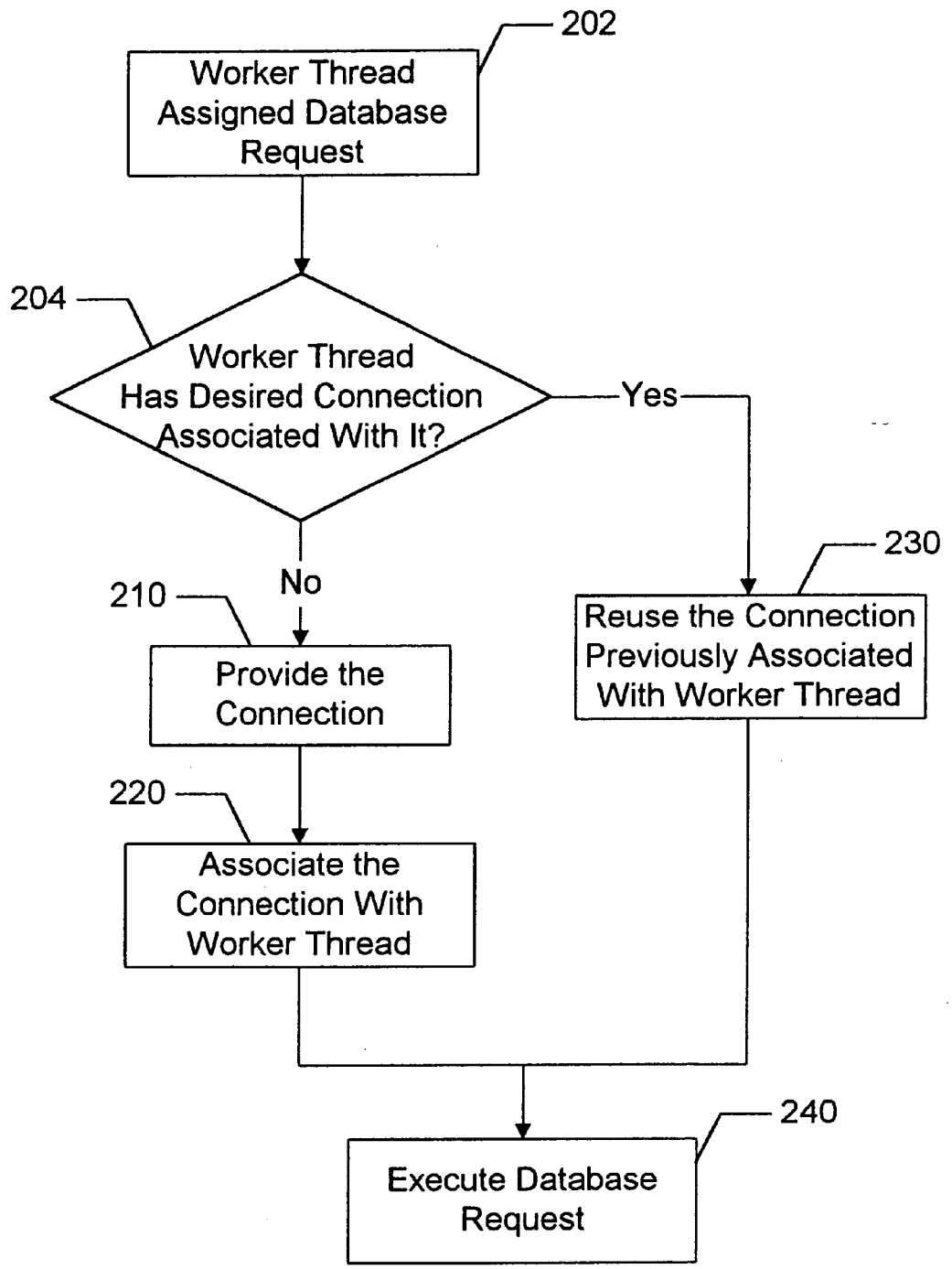
FIG. 5 is a flow chart depicting a method for processing database requests in accordance with the present invention.

FIG. 5 depicts a method 200 in accordance with the present invention for processing a request using the database management system 141. Preferably, the method 200 is executed using the service block 134 of the worker thread 126. The database request preferably includes a user identification that identifies the user or client 102, 104, or 106 generating the database request. The method 200 commences after the database request for information in the database 140 that requires the use of the database management system 141 received by the listener thread 124. A worker thread 124 is assigned to the database request, via step 202.

It is determined if the connection 160 between the worker thread 126 and the database subsystem 142 has previously been generated, via step 204. In one embodiment, this determination is made by determining whether the worker thread specific data 152 exists and what the elements of the worker thread specific data 152 are. If the connection 160 was not previously created, then the connection 160 to the database subsystem 142 is provided via step 210. The connection 160 is associated with the corresponding worker thread 126 via step 220. If the connection 160 was previously created, then the connection 160 is reused via step 230. The database request is then executed via step 240.

Figure 6:
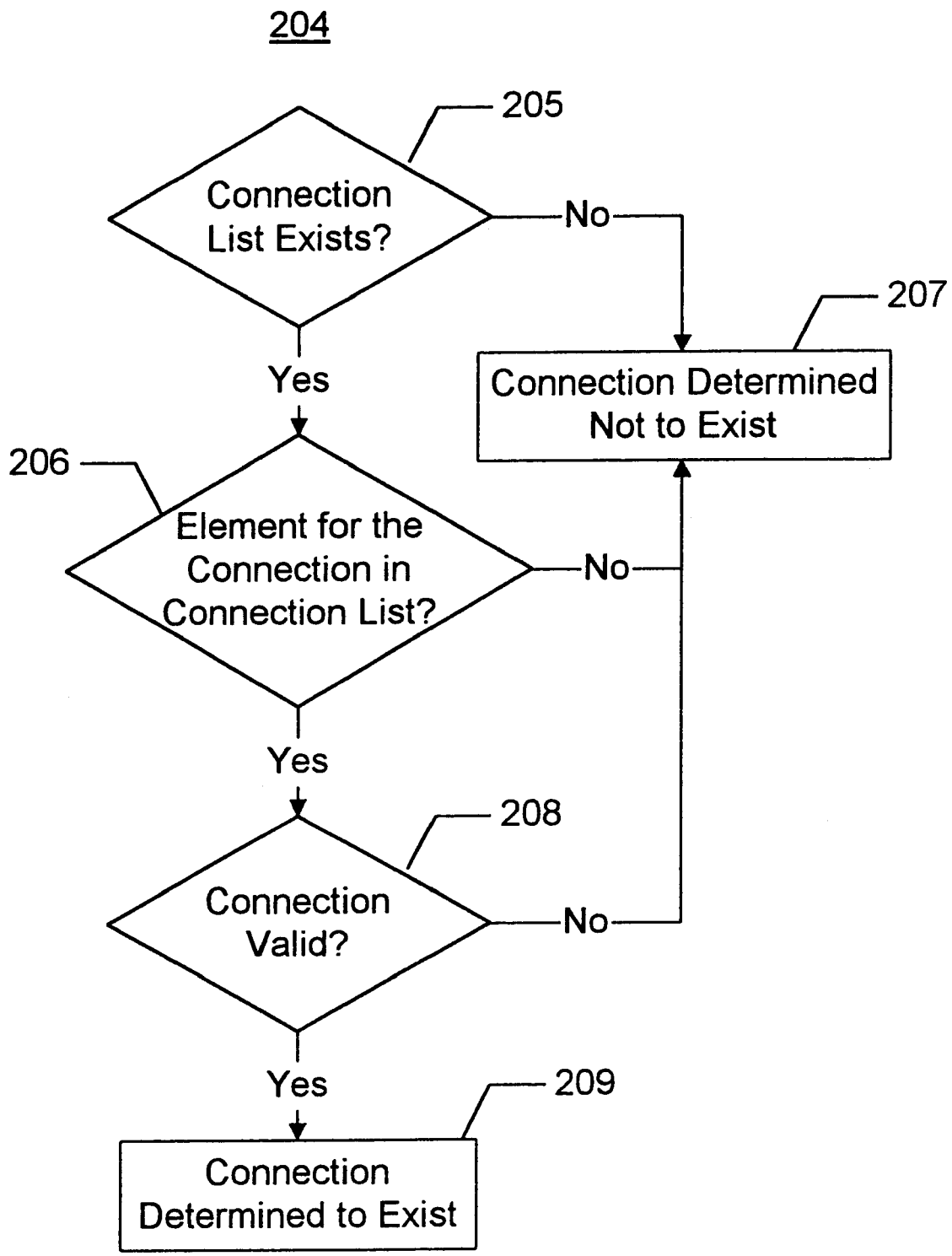
FIG. 6 is a flow chart depicting a preferred method for determining if the desired connection was previously generated.

FIG. 6 depicts a preferred embodiment of the step 204 of determining if the connection 160 between the worker thread 126 and the database subsystem 142 was previously generated. It is determined whether a connection list 154 exists for the worker thread 126, via step 205. If the connection list 154 does not exist, then it is determined in step 207 that the worker thread does not have the desired connection 160 associated with it. If the connection list 154 exists, then in step 206 it is determined if the connection list 154 associated with the worker thread 126 includes an element for the desired connection 160. If the connection list 154 does not include an element for the connection 160, then in step 207 it is determined that the connection 160 was not previously generated. If it is determined that an element for the connection 160 exists, then it is determined in step 208 if the connection 160 is still valid. If the database management system 141 was restarted between the time when the connection 160 was generated or last used and when step 208 is being performed, the connection 160 may no longer be valid. The connection 160 should, therefore be recreated. In a preferred embodiment, therefore, if the connection 160 is determined to be not valid in step 208, the connection 160 will be determined to be not previously generated in step 207. If, however, the connection 160 is valid, then the connection 160 will be determined to have been previously generated, via step 209. Also note that in a preferred embodiment, each connection 160 is between a particular worker thread 126 and a particular database subsystem 142. Thus, in a preferred embodiment, a separate element in the connection list 154 is saved for each connection made from a particular worker thread 126 to a different database subsystem (not shown). Thus, in a preferred embodiment, if the worker thread 126 was previously only connected to another database subsystem or subsystems (not shown), the desired connection will be determined to not have been previously generated in step 204.

Figure 7:
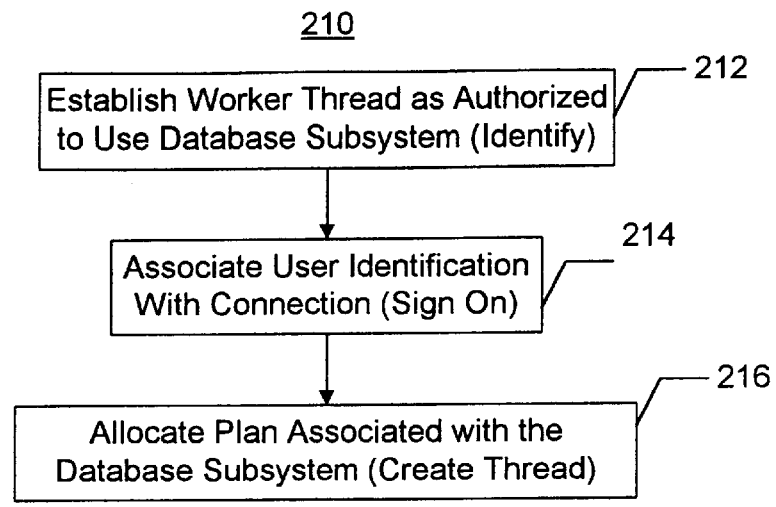
FIG. 7 is a flow chart depicting a method for creating a connection in accordance with the present invention.

FIG. 7 depicts a more detailed flow chart of one embodiment of the step 210 for creating the connection 160 when it has been determined that the connection 160 was not previously created. The worker thread 126 is identified as a thread which is authorized to use the database subsystem 142, via step 212. Thus, in a preferred embodiment, step 212 is an Identify step. The user identification provided in the database request is then associated with the connection 160 via step 214. Thus, in a preferred embodiment, step 214 is a Sign On step. The plan 146 corresponding to the database 142 subsystem is then associated with the connection 160, via step 216. Thus, in a preferred embodiment, step 216 is a Create Thread step. Consequently, the connection 160 is created.

Figure 8:
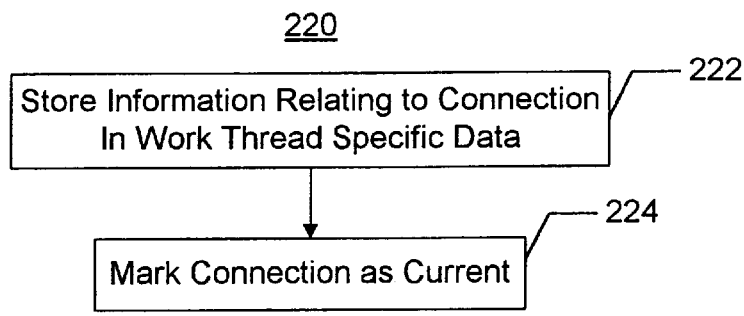
FIG. 8 is a flow chart depicting a method for associating a connection with a worker thread in accordance with the present invention.

FIG. 8 depicts a more detailed flow chart of one embodiment of the step 220 of associating the connection 160 created in step 210 with the worker thread 126. Information relating to the connection is stored in the thread specific data 152, via step 222. In a preferred embodiment, the step of storing information relating to the connection 160 includes storing this information in an element of the connection list 154. In a preferred embodiment, the step of storing the information relating to the connection 160 also includes associating an address of a location of the connection list 154 by storing a value of the key. Preferably, the information includes the user identification, the plan 146, and the identity of the database subsystem 142. The identity of the database subsystem 142 is used in part because multiple instances of the database management system 141 may be available on the same server. Note that if the connection 160 is the first connection being created by the server 110, then the element for the connection 160 is the first element in the connection list 154. The connection 160 is then marked as the current connection via step 224. In a preferred embodiment, step 224 includes marking the element for the connection 160 as the current connection. Note that as more connections (not shown) to other database subsystems (not shown) are associated with the worker thread 126, the number of elements in the connection list 154 grows. Eventually, there will be an element in the connection list 154 for each of the database subsystems 142 which the worker thread 126 will use.

Figure 9:
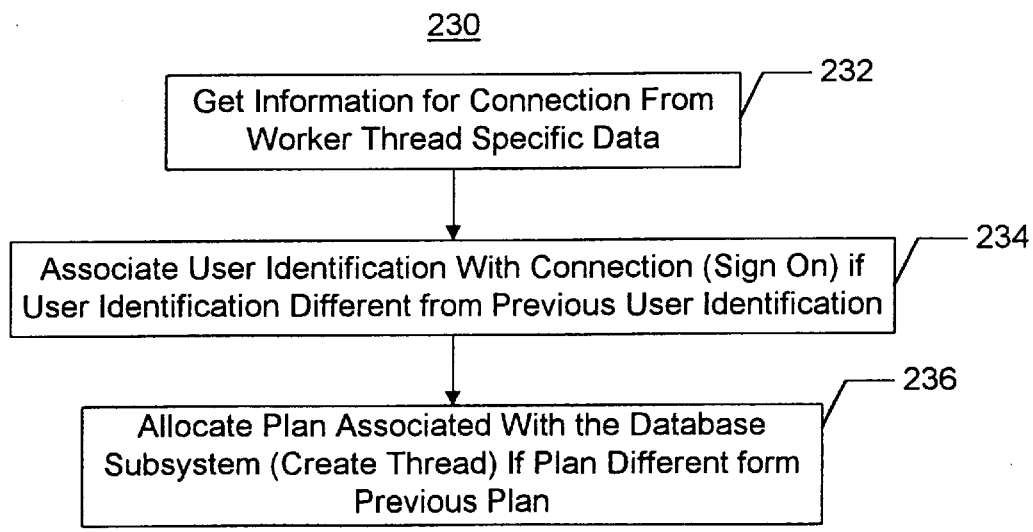
FIG. 9 is a flow chart depicting a method for reusing a connection associated with a worker thread in accordance with the present invention.

FIG. 9 depicts a more detailed flow chart of one embodiment of the step 230 of reusing the connection 160. Because the connection 160 is being reused, a previous user identification and previous plan (not shown) are associated with the connection 160 in the worker thread specific data 152. The previous user identification and previous plan are those which were associated with the connection 160 when the connection 160 was last used. The data relating to the connection is retrieved from the worker thread specific data 152, via step 232. In a preferred embodiment, this includes getting the data relating to the element corresponding to the connection 160 in the connection list 154 and marking the element as the current connection. If the user identification for the current database request is different from the previous user identification, then via step 234 the user identification for the current database request is associated with the connection 160. Thus, in a preferred embodiment, the Sign On step is repeated to change the user identification if the current database request is from a new user. If the plan is different from the previous plan, then via step 236 the plan is associated with the connection 160. Thus, in a preferred embodiment, the Create Thread step is repeated if the plan 146 is different from the previous plan. Note that since the database management system 141 generally includes a single plan for the plug-in 130, the previous plan will generally be the same as the plan 146. Thus, the Create Thread step will generally not be repeated in step 236.

Associating the connection 160 with the worker thread 126 allows the worker thread 126 to reuse connection 160 for subsequent database requests. Associating the connection 160 with the worker thread 126 saves information relating to the connection 160 in the worker thread specific data 152, which corresponds to a particular worker thread 126, across uses of the connection 160. The connection 160 can, therefore, be reused.

Reuse of the connection 160 simplifies processing of a database request because a connection does not have to be created each time the worker thread 126 processes a request which uses a database subsystem 142. This means that the Identify step, the Sign On step, and the Create Thread step may not need to be repeated each time the worker thread 126 processes a request using the database subsystem 142. Thus, because the connection 160 can be reused, the Identify step, which identifies the worker thread 126 as being authorized to use the database subsystem 142, need not be carried out each time the worker thread 126 utilizes the database subsystem 142. The time and cost to process the request using the worker thread 126 and the database subsystem 142 is thereby reduced. Where the same plan or the same user identification is used, the time and cost to process the database request is further reduced because the Sign On and Create Thread steps need not be repeated. Consequently, the time and cost required for the worker thread 126 to process a request utilizing the database subsystem 142 is decreased.

As execution of the server software 120 continues, a connection 160 corresponding to each worker thread 126 will be established to each database subsystem which the worker thread 126 will use. When all such connections are created, the system 100 will reach a steady state. Once the steady state is reached, the Identify step (step 212) may no longer be required for any of the worker threads 126. For example, in a preferred embodiment, the Identify step will only be performed if the connection 160 is lost, for example because the database management system 141 restarts. Thus, each worker thread 126 may be capable of reaping the benefits of reusing the corresponding connection 160 to each data base subsystem 142. Consequently, the time and cost to process any request utilizing any database subsystem 142 is reduced. When the database management system 141 includes a single plan, the time and cost to process a database request is further reduced because the Create Thread step (step 216 or 234) may not need to be repeated for each database request. Where the same user having the same user identification makes multiple database requests, the time and cost to process each database request is further reduced. This reduction in time and cost occurs because the Sign On step (step 212 or 232) may not be repeated for each database request. As discussed above, it is believed that the step that will most frequently be performed, even at steady state, is the Sign On step. This step is also generally the least time consuming and least costly. Thus, the method and system in accordance with the invention also reduce the number of times the more time consuming and costly steps are performed, particularly during steady state. Consequently, requests utilizing a database 140 will be more efficiently processed.

In a preferred embodiment, the method 200 is performed using the service block 134 of the worker thread 126. As discussed above, the service block 134 corresponds to the plug-in 130 and is invoked when the request utilizes the database 140. In one embodiment, the service block 134 may be invoked when a request which does not utilize the database 140 is received. In processing such a request, the server 110 would ignore the presence of the connection list 154 and not perform the method 200.

Also in a preferred embodiment, the user identification is used by the database subsystem 142 to determine if a particular user has access to a portion of the database 140. If a user is not determined to be authorized, then the user may not use or change that portion of the database 140. In accordance with the present invention, the information in the element of the connection list 154 marked as current includes the user identification. Thus, it can be determined if the user identification for the current database request is the same as a previous user identification for the previous database request. If so, the previous user identification can by used by the database subsystem 142 to determine if the user has access to a particular portion of the database 140. If not, the current user identification for the current database request is used by the database subsystem 142 to determine if the user has access to a particular portion of the database 140. Consequently, the security of the database 140 may be maintained.

Also in a preferred embodiment, the present invention is scaleable. The preceding description can be viewed as relevant to a particular address space of the server 110. Certain operating system software, such as the preferred operating system OS/390, may provide a mechanism for creating new address spaces to handle new requests when all of the worker threads 126 are already being used. Certain operating system software, such as the preferred operating system OS/390, may also contract the number of address spaces if the worker threads in an address space are idle for a particular amount of time. In the preferred embodiment, the present invention can be invoked by the plug-in 130 in each of the address spaces. Thus, the ability to reuse connections can be extended as the workload changes.

A method and system has been disclosed for processing requests utilizing a database. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-readable medium including a program for processing a request utilizing a database management system in a computer system, the database management system for managing at least one database, at least one database management system instance corresponding to the database management system being available, the computer system including a plurality of threads, the program comprising instructions for:

providing a connection to a particular database management system instance of the at least one database management system instance for a thread of the plurality of threads if the thread has not previously used the particular database management system instance; wherein the thread aids in the execution of the request;

associating the connection with the thread if the thread has not previously utilized the particular database management system instance; and reusing the connection to the particular database management system instance that is associated with the thread if the thread has previously used the particular database management system instance.

2. The computer-readable medium of claim 1 wherein the request further includes a user identification and at least a portion of a plan, and wherein instructions for providing connections further include instructions for:

establishing the thread as a user of the particular database management system instance;

associating the user identification with the connection; and allocating the plan for the connection, the plan capable of being used to access data using the particular database management system instance.

3. The computer-readable medium of claim 2 wherein the instructions for associating the connection further include instructions for:

storing a connection list, information relating to the connection being stored in a corresponding element of the connection list.

4. The computer-readable medium of claim 3 wherein the instructions for associating the connection further include instructions for:

marking the element corresponding to the connection as a current connection.

5. The computer-readable medium of claim 1 wherein the request further includes a user identification and at least a portion of a plan, and wherein the instructions for reusing the connection further include instructions for:

retrieving information relating to the connection, the information including a previous user identification, a previous plan associated with the particular database management system instance, and data indicating that the thread is a user of the particular database management system instance;

associating the user identification with the connection if the user identification is different from a prior user identification used when the thread last used the connection; and allocating the plan for the connection, the plan capable of being used to access data in the particular database management system instance if the user plan is different from a prior plan used when the thread previously used the connection.

6. A method for processing a request utilizing a database management system in a computer system, the database management system managing at least one database, at least one instance of the database management system being available, the computer system including a plurality of threads, the method comprising the steps of:

(a) providing a connection to a particular instance of the database management system of the at least one instance of the database management system for a thread of the plurality of threads if the thread has not previously used the particular database management system instance; wherein the thread aids in the execution of the request;

(b) associating the connection with the thread if the thread has not previously utilized the particular database management system instance; and (c) reusing the connection to the particular database management system instance that is associated with the thread if the thread has previously used the particular database management system instance.

7. The method of claim 6 wherein the request further includes a user identification and at least a portion of a plan and wherein the connection providing step (b) further includes the steps of:

(a) establishing the thread as a user of the particular database management system instance;

(a2) associating the user identification with the connection; and (a3) allocating the plan for the connection, the plan capable of being used to access data in the particular database management system instance.

8. The method of claim 6 wherein the connection associating step (c) further includes the step of:

(b1) maintaining a connection list, information relating to the connection being stored in a corresponding element of the connection list.

9. The method of claim 8 wherein the connection associating step (b) further includes the step of:

(b2) marking the element corresponding to the connection as a current connection.

10. The method of claim 6 wherein the request further includes a user identification and at least a portion of a plan, and wherein the connection reusing step (c) further includes the steps of:

(c1) retrieving information relating to the connection, the information including a previous user identification, a previous plan associated with the particular database management system instance, and data indicating that the thread is a user of the particular database management system instance;

(c2) associating the user identification with the connection if the user identification is different from a prior user identification used when the thread previously used the connection; and (c3) allocating the plan for the connection, the plan capable of being used to access data in the at least one database if the plan is different from a prior plan used when the thread previously used the connection.

11. A system for processing a request utilizing a database management system in a computer system, the database management system managing at least one database, at least one database management system instance corresponding to the database management system being available, the system comprising:

a plug-in module; and a plurality of threads, a thread of the plurality of threads aiding in execution of the request, the thread utilizing the plug-in module for providing a connection to a particular database management system instance of the at least one database management system instance for the thread if the thread has not previously used the particular database management system instance, for associating the connection with the thread if the thread has not previously utilized the particular database management system instance, and for reusing the connection to the particular database management system instance that is associated with the thread if the thread has previously used the particular database management system instance.

12. The system of claim 11 wherein the request further includes a user identification and at least a portion of a plan, and wherein the at least one database management system instance further includes an attach facility, the attach facility further comprising:

means for establishing the thread as a user of the particular database management system instance;

means for associating the user identification with the connection; and means for allocating the plan for use with the connection, the plan capable of being used to access data in the at least one database;

wherein the plug-in module utilizes the attach facility for establishing the thread as a user of the particular database management system instance, associating the user identification with the connection and allocating the plan for use with the connection.

13. The system of claim 11 further comprising:

means for storing a connection list, information relating to the connection being stored in a corresponding element of the connection list.

* * * * *

UNITED STATES PATENT AND TRADEMARK OFFICE
CERTIFICATE OF CORRECTION

PATENT NO. : 6,339,771 B1
DATED : January 15, 2002
INVENTOR(S) : Melvin R. Zimowski et al.

It is certified that error appears in the above-identified patent and that said Letters Patent is hereby corrected as shown below:

<u>Column 3,</u>
Line 18, after "is" add -- to --.

Signed and Sealed this

Twenty-third Day of April, 2002

Attest:

Attesting Officer

JAMES E. ROGAN
*Director of the United States Patent and Trademark Office*